(12) United States Patent
Hattori et al.

(10) Patent No.: US 12,695,157 B2
(45) Date of Patent: Jul. 28, 2026

(54) SILICONE LAMINATE AND BATTERY

(71) Applicant: Fuji Polymer Industries Co., Ltd., Nagoya (JP)

(72) Inventors: Masakazu Hattori, Aichi (JP); Yuko Kimura, Aichi (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 623 days.

(21) Appl. No.: 18/252,679

(22) PCT Filed: Oct. 20, 2021

(86) PCT No.: PCT/JP2021/038789
§ 371 (c)(1),
(2) Date: May 11, 2023

(87) PCT Pub. No.: WO2022/224468
PCT Pub. Date: Oct. 27, 2022

(65) Prior Publication Data
US 2024/0006723 A1 Jan. 4, 2024

(30) Foreign Application Priority Data

Apr. 22, 2021 (JP) ................................. 2021-072841

(51) Int. Cl.
*H01M 50/483* (2021.01)
*H01M 50/477* (2021.01)

(52) U.S. Cl.
CPC ....... *H01M 50/483* (2021.01); *H01M 50/477* (2021.01)

(58) Field of Classification Search
CPC .......... B32B 2250/05; B32B 2250/248; B32B 2250/42; B32B 2266/0207;

(Continued)

(56) References Cited

U.S. PATENT DOCUMENTS 5,294,373 A * 3/1994 Takahashi ................ C08K 5/14
252/502
5,857,136 A * 1/1999 Yoneda .............. G03G 15/2064
399/329

(Continued)

FOREIGN PATENT DOCUMENTS

CN       108795302       2/2021
JP       2-219645        9/1990

(Continued)

OTHER PUBLICATIONS

Machine translation JPH0569511A (Year: 1993).*

(Continued)

*Primary Examiner* — Victoria H Lynch
(74) *Attorney, Agent, or Firm* — HSML P.C.

(57) ABSTRACT

A silicone laminate 1 includes layers of a silicone rubber layer (A) 2 and a silicone layer (B) 3 with a lower hardness than the silicone rubber layer (A) 2. The silicone layer (B) 3 is at least one layer selected from the group consisting of a silicone sponge layer (B1) and a silicone gel layer (B2). Both the silicone rubber layer (A) 2 and the silicone layer (B) 3 are made of a material that is converted to ceramic and forms a sintered body when burned, so that the material retains its shape. The silicone laminate 1 is fire resistant. It is preferable that the silicone rubber layer (A) 2 and the silicone layer (B) 3 are alternately stacked, and that the number of layers is two or more for each of the layers (A) and (B), and four or more in total. Thus, the silicone laminate has high fire resistance and high compressive resistance as a cushioning material for batteries.

9 Claims, 2 Drawing Sheets

(58) Field of Classification Search
CPC ...... B32B 2307/3065; B32B 2307/536; B32B 2307/7376; B32B 2457/04; B32B 2457/10; B32B 25/045; B32B 25/08; B32B 25/20; B32B 2605/00; B32B 27/283; B32B 5/18; B32B 7/022; H01M 2220/20; H01M 50/204; H01M 50/293; H01M 50/477; H01M 50/483; Y02E 60/10
See application file for complete search history.

(56) References Cited

U.S. PATENT DOCUMENTS

| | | | | |
|---|---|---|---|---|
| 2016/0369143 | A1* | 12/2016 | Hayashida | C08K 3/36 |
| 2018/0223070 | A1 | 8/2018 | O'Neal et al. | |
| 2021/0101371 | A1 | 4/2021 | Ross | |

FOREIGN PATENT DOCUMENTS

| | | | | |
|---|---|---|---|---|
| JP | H0569511 A | * | 3/1993 | B32B 25/08 |
| JP | 5-042976 | | 6/1993 | |
| JP | 5-196196 | | 8/1993 | |
| JP | 6-049917 | | 2/1994 | |
| JP | 10-321887 | | 12/1998 | |
| JP | 11-034236 | | 2/1999 | |
| JP | 11-247326 | | 9/1999 | |
| JP | 2002-105317 | | 4/2002 | |
| JP | 2002-189369 | | 7/2002 | |
| JP | 2003-118040 | | 4/2003 | |
| JP | 2011-168728 | | 9/2011 | |
| JP | 2019-172762 | | 10/2019 | |
| JP | 2020-507194 | | 3/2020 | |
| JP | 2021-015696 | | 2/2021 | |

OTHER PUBLICATIONS

Machine translation JPH11247326A (Year: 1999).*
Extended European Search Report issued in corresponding European Patent Application No. 21937958.3, May 27, 2024, 6 pages.
Office Action issued in corresponding European Patent Application No. 21937958.3, Nov. 18, 2024, 4 pages.
International Search Report issued in International Application No. PCT/JP2021/038789 filed Dec. 28, 2021, 7 pages w/translation.

* cited by examiner

SILICONE LAMINATE AND BATTERY

TECHNICAL FIELD

The present invention relates to a silicone laminate that is useful, e.g., as a cushioning material between battery cells.

BACKGROUND ART

The demand and production of electric vehicles (EV), plug-in hybrid electric vehicles (PHEV), and hybrid electric vehicles (HEV) have been increasing in recent years. These electric vehicles are powered by electricity from batteries and run on electric motors (motors). In general, a battery includes an array of battery cells and a cell case housing the battery cells. The battery is designed with a variety of abnormal situations in mind. One of such abnormal situations is abnormal heat generation, including a thermal runaway reaction. When abnormal heat generation occurs, the cell material can be deformed or damaged due to the expansion of the cells.

Patent Document 1 proposes a flame-retardant, thermally expandable member with a thermal conductivity of 1 W/m·k or more at a temperature of 80° C. or less. The thermal conductivity of the thermally expandable member is reduced to 0.5 W/m·k or less when the temperature exceeds 80° C. Patent Document 2 proposes a foam including a silicone rubber binder and hollow glass beads. This foam is used to fill the open space of a battery module casing. Patent Document 3 proposes a heat dissipating member to dissipate heat from a battery. The heat dissipating member includes a heat conductive sheet having a cylindrical shape, a U-shaped cross section, or a spiral shape, a cushioning material, and an adhesive layer.

PRIOR ART DOCUMENTS

Patent Documents

Patent Document 1: JP 2019-172762 A
Patent Document 2: JP 2020-507194 A
Patent Document 3: JP 2021-015696 A

DISCLOSURE OF INVENTION

Problem to be Solved by the Invention

However, the above conventional technology still has problems with the fire resistance and compressive resistance of a cushioning material for batteries, and is required to improve further.

To solve the conventional problems, the present invention provides a silicone laminate with high fire resistance and high compressive resistance as a cushioning material for batteries.

Means for Solving Problem

A silicone laminate of the present invention includes layers of a silicone rubber layer (A) and a silicone layer (B) with a lower hardness than the silicone rubber layer (A). The silicone layer (B) is at least one layer selected from the group consisting of a silicone sponge layer (B1) and a silicone gel layer (B2). Both the silicone rubber layer (A) and the silicone layer (B) are made of a material that is converted to ceramic and forms a sintered body when burned, so that the material retains its shape. The silicone laminate is fire resistant.

Effects of the Invention

The silicone laminate of the present invention includes layers of a silicone rubber layer (A) and a silicone layer (B) with a lower hardness than the silicone rubber layer (A). The silicone layer is at least one layer selected from the group consisting of a silicone sponge layer (B1) and a silicone gel layer (B2). Both the silicone rubber layer (A) and the silicone layer (B) are made of a material that is converted to ceramic and forms a sintered body when burned, so that the material retains its shape. The silicone laminate is fire resistant. Thus, the silicone laminate can achieve high fire resistance and high compressive resistance as a cushioning material for batteries. The silicone laminate with these properties can prevent deformation even if a battery generates heat abnormally.

DESCRIPTION OF THE INVENTION

Figures 1A, 1B:
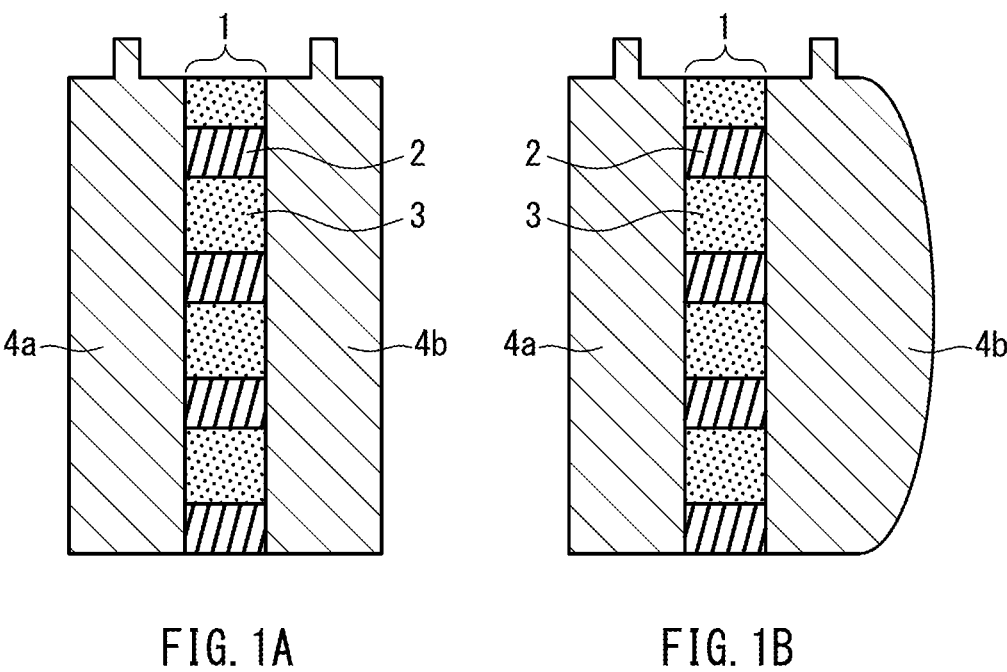
FIG. 1A is a schematic cross-sectional view of a silicone laminate located between an adjacent pair of battery cells in an embodiment of the present invention.
FIG. 1B is a schematic cross-sectional view of the silicone laminate located between the adjacent pair of battery cells when abnormal heat generation occurs.

A silicone laminate of the present invention includes layers of a silicone rubber layer (A) and a silicone layer (B) with a lower hardness than the silicone rubber layer (A). The Asker A hardness of the silicone rubber layer (A) is preferably 40 to 80. The Asker C hardness of the silicone layer (B) is preferably 30 to 70. The hardness of the silicone rubber layer (A) is higher than that of the silicone layer (B). Therefore, the silicone rubber layer (A) with a high hardness serves as a core, which is resistant to deformation due to the expansion of a battery cell and also maintains fire resistance and thermal insulation properties.

The silicone layer (B) is at least one layer selected from a silicone sponge layer (B1) and a silicone gel layer (B2). This means that the silicone layer (B) has a lower hardness than the silicone rubber layer (A). Both the silicone rubber layer (A) and the silicone layer (B) are made of a material that is converted to ceramic and forms a sintered body when burned, so that the material retains its shape. Such a silicone material may be, e.g., Silicone Base KE-1734-U manufactured by Shin-Etsu Chemical Co., Ltd., which is a commercially available product. The use of this silicone material imparts fire resistance to the silicone laminate. Because of the fire resistance, the silicone laminate is less likely to burn even if a battery cell generates heat abnormally.

It is preferable that the silicone rubber layer (A) and the silicone layer (B) are alternately stacked, and that the number of layers is two or more for each of the layers (A) and (B), and four or more in total. The silicone rubber layer (A) and the silicone layer (B) each have a predetermined thickness of e.g., 1 to 100 mm. The number of layers can be selected in accordance with the size of a battery cell.

The thickness of the silicone rubber layer (A) in the stacking direction is 1 to 100 mm. The thickness of the silicone layer (B) in the stacking direction is 1 to 100 mm. The silicone layer (B) is preferably 0.1 to 10 times as thick as the silicone rubber layer (A). The layers with the thicknesses in these ranges can easily be produced.

The silicone laminate preferably has sufficient fire resistance to retain its shape when burned with a gas burner for 5 minutes. The gas burner meets the UL 94 standard, the sixth edition (2013). The silicone laminate with this fire resistance is less likely to burn even if a battery cell generates heat abnormally.

The silicone laminate preferably has flame retardance as well as the fire resistance, and may be classified as 5VB in a vertical burning test under the UL 94 standard, the sixth edition (2013). The above fire-resistant silicone material may be used to fulfill the criteria for the 5VB classification. The results of the UL94 vertical burning test are ranked in order from the highest to the lowest: 5VA, 5VB, V-0, V-1, and V-2. The vertical burning test for 5VB is similar to that for V-0, V-1, and V-2, but differs in that the combustion energy of a gas burner used in the former test is 10 times greater than that of a gas burner used in the latter test. To achieve the 5VB rating, the material needs to satisfy the following three conditions:

(1) Each test specimen shall not burn for more than 60 seconds after the fifth flame application;

(2) Each test specimen shall not dip (flaming particles); and (3) Each test specimen shall not have any significant damage to the portion in contact with flame.

The silicone sponge layer (B1) is preferably an independent foam with an expansion ratio of 1.2 to 3 times. If a battery cell generates heat abnormally, the silicone sponge layer with this expansion ratio will disappear or foam, while the fire-resistant rubber layer will be left. Thus, the silicone laminate can also have thermal insulation properties.

The compressive strength of the silicone laminate is preferably 1 to 30 N/mm² when the silicone laminate is compressed to 50%. This configuration can prevent deformation and damage to a battery cell if the battery cell generates heat abnormally. Because of this function, the silicone laminate is useful as a cushioning material located between an adjacent pair of battery cells.

Both the silicone rubber layer (A) and the silicone layer (B) are preferably of a peroxide vulcanization type. The peroxide vulcanization type has better workability than addition vulcanization.

Examples of the organic peroxide include benzoyl peroxide, 2,4-dichlorobenzoyl peroxide, bis(2,4-dichlorobenzoyl) peroxide, p-methylbenzoyl peroxide, o-methylbenzoylperoxide, 2,4-dicumylperoxide, 2,5-dimethyl-2,5-bis(t-butylperoxy)hexane, di-t-butyl peroxide, t-butyl perbenzoate, and 1,6-hexanediol-bis-t-butyl peroxycarbonate. The amount of the organic peroxide added is preferably 0.1 to 15 parts by mass, and more preferably 0.2 to 10 parts by mass with respect to 100 parts by mass of the silicone rubber component. If the amount of the organic peroxide is too small, the crosslinking reaction does not proceed sufficiently, so that the physical properties may be reduced, leading to, e.g., a decrease in hardness, alack of rubber strength, and an increase in compression set. If the amount of the organic peroxide is too large, many degradation products of the cuing agent are generated, so that the physical properties may be reduced (e.g., an increase in compression set), and discoloration of the resulting sheet may be increased.

Hereinafter, the present invention will be described with reference to the drawings. In the following drawings, the same components are denoted by the same reference numerals. FIG. 1A is a schematic cross-sectional view of a silicone laminate 1 located between an adjacent pair of battery cells 4a, 4b in an embodiment of the present invention. The silicone laminate 1 includes layers of a silicone rubber layer (A) 2 and a silicone layer (B) 3 with a lower hardness than the silicone rubber layer (A) 2. The silicone layer (B) 3 is a silicone sponge layer (B1) or a silicone gel layer (B2). FIG. 1B is a schematic cross-sectional view of the silicone laminate 1 when abnormal heat generation occurs. The silicone rubber layer (A) 2 has fire resistance and a high hardness. Therefore, the silicone rubber layer (A) 2 serves as a core that prevents the silicone laminate 1 from being deformed between the battery cells 4a, 4b upon their expansion and also maintains fire resistance and thermal insulation properties.

Figures 2A, 2B:
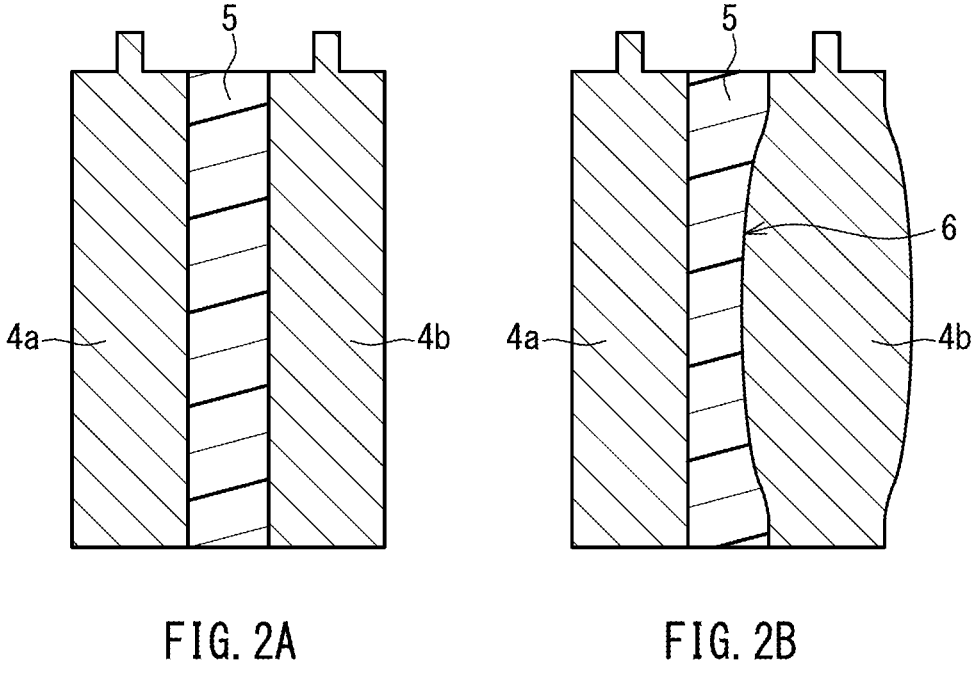
FIG. 2A is a schematic cross-sectional view of a silicone material located between an adjacent pair of battery cells in a comparative example.
FIG. 2B is a schematic cross-sectional view of the silicone material located between the adjacent pair of battery cells when abnormal heat generation occurs.

FIG. 2A is a schematic cross-sectional view of a silicone material 5 located between an adjacent pair of battery cells 4a, 4b in a comparative example. FIG. 2B is a schematic cross-sectional view of the silicone material 5 when abnormal heat generation occurs. As shown in FIG. 2B, in the case of abnormal heat generation, e.g., the battery cell 4b is deformed into an expanded portion 6, resulting in damage to the adjacent battery cell 4a.

Figure 3:
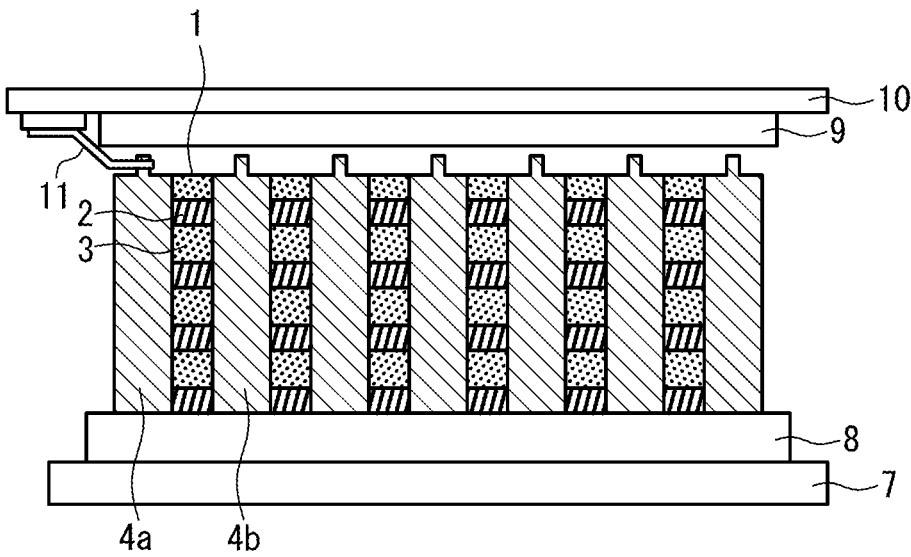
FIG. 3 is a schematic cross-sectional view of a battery in which silicone laminates are located between adjacent pairs of a plurality of battery cells in an embodiment of the present invention.

FIG. 3 is a schematic cross-sectional view of a battery in which silicone laminates 1 are located between adjacent pairs of a plurality of battery cells 4a, 4b in an embodiment of the present invention. The plurality of battery cells 4a, 4b are placed on a thermally conductive sheet (TIM) 8, which is disposed on a cooling unit 7. The silicone laminates 1 are located between adjacent pairs of the battery cells 4a, 4b. The top of the battery is covered with a cushioning material sheet 9 and a cell case 10. A wire 11 is drawn from battery cell 4a.

EXAMPLES

Hereinafter, the present invention will be described by way of examples. However, the present invention is not limited to the following examples. Various parameters were measured in the following manner.

<Fire Resistance>

It was examined whether a material would retain its shape when burned with a gas burner for 5 minutes. In this case, the thermal energy of the gas burner was the same as that of a gas burner used in the vertical burning test for V-0, V-1, or V-2 classification under the UL 94 standard, the sixth edition (2013).

<Flame Retardance>

The UL 94 vertical burning test was performed on a material to determine whether the material had flame retardance that would be classified as 5VB.

<Hardness>

The Asker A hardness and the Asker C hardness were measured with a rubber hardness tester specified in JISK 7312(1996).

<Method for Measuring Compressive Strength>
  Measurement method: ASTM D575-91(2021)
  Size of sample: 10 mm long and 10 mm wide (the thickness is shown in the following tables)
  Size of upper and lower pressure plates: 30 mm long, 30 mm wide, and 4 mm thick
  Compression speed: 5 mm/min
  Compressibility: 10 to 50%
  Test Method
    (1) A layered sample was sandwiched between the upper and lower pressure plates.
    (2) The sample was compressed to 10 to 50%, in which the measurement started at the position where the load was detected.
    (3) The load value for each amount of compression was recorded.

Examples 1 to 4, Comparative Examples 1 to 5

1. Material Components
(1) Silicone Rubber Layer A
  (a) 100 parts by weight of Silicone Base KE-1734-U (manufactured by Shin-Etsu Chemical Co., Ltd.) was combined with 2.5 parts by weight of a vulcanizing agent (bis(2,4-dichlorobenzoyl) peroxide), and mixed together with two rolls.
  (b) The mixture was press molded at 120° C. for 5 minutes using a pressing machine.
  (c) The sheet thus obtained was subjected to secondary vulcanization at 200° C. for 4 hours.

(2) Silicone Sponge Layer B1
  (a) 100 parts by weight of Silicone Base KE-1734-U (manufactured by Shin-Etsu Chemical Co., Ltd.) was combined with 2.9 parts by weight of a vulcanizing agent (bis(2,4-dichlorobenzoyl) peroxide) and 4 parts by weight of a foaming agent, and mixed together with two rolls.
  (b) The mixture was press molded at 150° C. for 10 minutes using a pressing machine. During the press molding, the mixture foamed (independent foaming) and the expansion ratio doubled.
  (c) The sheet thus obtained was subjected to secondary vulcanization at 200° C. for 4 hours.
(3) Silicone Rubber Layer without Fire Resistance
  (a) 100 parts by weight of Silicone Base SH 502 UA/B (manufactured by Dow Toray Co., Ltd.) was mixed with 2.5 parts by weight of a vulcanizing agent (bis(2, 4-dichlorobenzoyl) peroxide), and mixed together with two rolls.
  (b) The mixture was press molded at 120° C. for 5 minutes using a pressing machine.
  (c) The sheet thus obtained was subjected to secondary vulcanization at 200° C. for 4 hours.
  (d) The Asker A hardness of the sheet was 50.
(4) Lamination Method
  The surfaces of the cured sheets were treated with corona, heated at 80° C. for 1 hour, and bonded to each other.
  Tables 1 and 2 show various physical properties of the laminates thus obtained.

TABLE 1

|  |  | Ex. 1 | Ex. 2 | Ex. 3 | Ex. 4 |
|---|---|---|---|---|---|
| Thickness (mm) of silicone rubber layer (A) |  | 2 | 1 | 2 | 4 |
| Thickness (mm) of Silicone sponge layer (B1) |  | 6 | 2 | 2 | 2 |
| Number of layers |  | 7 | 7 | 7 | 7 |
| Asker A hardness of silicone rubber layer (A) |  | 70 | 70 | 70 | 70 |
| Asker C hardness of silicone sponge layer (B1) |  | 55 | 55 | 55 | 55 |
| Fire resistance of laminate with gas burner for 5 minutes |  | Yes | Yes | Yes | Yes |
| Flame retardance meeting UL945VB |  | Yes | Yes | Yes | Yes |
| Compressive strength (N/mm$^2$) | 10% | 0.32 | 0.32 | 0.40 | 0.56 |
|  | 20% | 0.88 | 0.70 | 1.13 | 1.63 |
|  | 30% | 0.99 | 0.78 | 1.44 | 2.47 |
|  | 40% | 1.01 | 1.15 | 1.60 | 3.77 |
|  | 50% | 1.64 | 2.09 | 2.82 | 6.57 |

(Note:
The number of layers was seven: A-B1-A-B1-A-B1-A.)

TABLE 2

|  |  | Comp. Ex. 1 | Comp. Ex. 2 | Comp. Ex. 3 | Comp. Ex. 4 | Comp. Ex. 5 |
|---|---|---|---|---|---|---|
| Thickness (mm) of silicone rubber layer (A) |  | 2 | — | — | — | — |
| Thickness (mm) of silicone sponge layer (B1) |  | — | 2 | — | — | — |
| Thickness (mm) of silicone rubber layer (C) without fire resistance |  | — | — | 2 | 2 | 4 |
| Thickness (mm) of silicone sponge layer (D) without fire resistance |  | — | — | 6 | 2 | 2 |
| Number of layers |  | 0 | 0 | 7 | 7 | 7 |
| Asker A hardness of silicone rubber layer (A) |  | 70 | 70 | — | — | — |
| Asker C hardness of silicone sponge layer (B1) |  | 55 | 55 | — | — | — |
| Fire resistance of laminate with gas burner for 5 minutes |  | Yes | Yes | No | No | No |
| Flame retardance meeting UL 94 5VB |  | Yes | Yes | No | No | No |
| Compressive strength (N/mm$^2$) | 10% | 1.7 | 0.08 | 0.15 | 0.17 | 0.16 |
|  | 20% | 3.39 | 0.18 | 0.36 | 0.44 | 0.50 |
|  | 30% | 5.74 | 0.32 | 0.59 | 0.75 | 0.94 |

TABLE 2-continued

|  | Comp. Ex. 1 | Comp. Ex. 2 | Comp. Ex. 3 | Comp. Ex. 4 | Comp. Ex. 5 |
|---|---|---|---|---|---|
| 40% | 9.16 | 0.59 | 0.72 | 0.96 | 1.56 |
| 50% | 13.9 | 1.46 | 1.05 | 1.36 | 2.74 |

(Note:
The number of layers in Comparative Examples 3 to 5 was seven: C-D-C-D-C-D-C.)

As shown in Tables 1 and 2, the results confirmed that the silicone laminates in Examples 1 to 4 had high fire resistance and high compressive resistance, compared to the silicone laminate each of thein Comparative Examples. These properties can protect the silicone laminate from deformation even if the battery generates heat abnormally.

Examples 5 to 7

An organopolysiloxane was used, which was a commercially available addition reaction type silicone gel material (composed of an agent A and an agent B; one of them containing a crosslinking agent and the other containing a platinum-based catalyst). Then, 100 parts by weight of the organopolysiloxane was mixed with 2 parts by weight of a crosslinking agent and 1 part by weight of a platinum catalyst. The mixture was press molded at 100° C. for 10 minutes using a pressing machine. Table 3 shows the conditions and results.

TABLE 3

|  |  | Ex. 5 | Ex. 6 | Ex. 7 |
|---|---|---|---|---|
| Thickness (mm) of silicone rubber layer (A) |  | 2 | 4 | 2 |
| Thickness (mm) of silicone gel layer (B2) |  | 2 | 2 | 6 |
| Number of layers |  | 7 | 7 | 7 |
| Asker A hardness of silicone rubber layer (A) |  | 70 | 70 | 70 |
| Asker C hardness of silicone gel layer (B2) |  | 40 | 40 | 40 |
| Fire resistance of laminate with gas burner for 5 minutes |  | Yes | Yes | Yes |
| Flame retardance meeting UL945VB |  | Yes | Yes | Yes |
| Compressive strength (N/mm²) | 10% | 0.46 | 0.55 | 0.22 |
|  | 20% | 1.24 | 1.45 | 0.44 |
|  | 30% | 0.93 | 2.09 | 0.51 |
|  | 40% | 0.96 | 3.09 | 0.64 |
|  | 50% | 1.50 | 4.19 | 0.95 |

(Note:
The number of layers was seven: A-B2-A-B2-A-B2-A.)

As shown in Table 3, the results confirmed that the silicone laminates in Examples 5 to 7 had high fire resistance, high flame retardance, and high compressive resistance. These properties can protect the silicone laminate from deformation even if the battery generates heat abnormally.

INDUSTRIAL APPLICABILITY

The silicone laminate of the present invention is useful as a cushioning material for battery cells, and is also suitable for various types of cushioning materials.

DESCRIPTION OF REFERENCE NUMERALS

1 Silicone laminate
2 High hardness silicone rubber layer (A)
3 Low hardness silicone layer (B)
4a, 4b Battery cell
5 Silicone material

6 Expanded portion
7 Cooling unit
8 Thermally conductive sheet (TI)
9 Cushioning material sheet
10 Cell case
11 Wire

The invention claimed is:

1. A silicone laminate comprising layers of a silicone rubber layer (A) and a silicone layer (B) with a lower hardness than the silicone rubber layer (A), wherein the silicone layer (B) is a silicone sponge layer that is an independent foam with an expansion ratio of 1.2 to 3 times, the silicone rubber layer (A) and the silicone layer (B) are alternately stacked, and a number of layers is two or more for each of the layers (A) and (B), and four or more in total, the silicone rubber layer (A) has an Asker A hardness of 40 to 80, and the silicone layer (B) has an Asker C hardness of 30 to 70, a thickness of the silicone rubber layer (A) in a stacking direction is 1 to 100 mm, a thickness of the silicone layer (B) in the stacking direction is 1 to 100 mm, and the silicone layer (B) is 0.1 to 10 times as thick as the silicone rubber layer (A), a compressive strength of the silicone laminate is 1 to 30 N/mm² when the silicone laminate is compressed to 50%, both the silicone rubber layer (A) and the silicone layer (B) are made of a material that is converted to ceramic and forms a sintered body when burned, so that the material retains its shape, and the silicone laminate is fire resistant.

2. The silicone laminate according to claim 1, wherein the silicone laminate has sufficient fire resistance to retain its shape when burned with a gas burner for 5 minutes.

3. The silicone laminate according to claim 1, wherein the silicone laminate has flame retardance as well as the fire resistance, and is classified as 5VB in a vertical burning test under a UL 94 standard.

4. The silicone laminate according to claim 1, wherein both the silicone rubber layer (A) and the silicone layer (B) are vulcanized with peroxide.

5. A battery comprising a silicone laminate, the silicone laminate comprising layers of a silicone rubber layer (A) and a silicone layer (B) with a lower hardness than the silicone rubber layer (A), wherein the silicone layer (B) is a silicone sponge layer that is an independent foam with an expansion ratio of 1.2 to 3 times, the silicone rubber layer (A) and the silicone layer (B) are alternately stacked, and a number of layers is two or more for each of the layers (A) and (B), and four or more in total, the silicone rubber layer (A) has an Asker A hardness of 40 to 80, and the silicone layer (B) has an Asker C hardness of 30 to 70, a thickness of the silicone rubber layer (A) in a stacking direction is 1 to 100 mm, a thickness of the silicone layer (B) in the stacking direction is 1 to 100 mm, and the silicone layer (B) is 0.1 to 10 times as thick as the silicone rubber layer (A), a compressive strength of the silicone laminate is 1 to 30 $N/mm^2$ when the silicone laminate is compressed to 50%, both the silicone rubber layer (A) and the silicone layer (B) are made of a material that is converted to ceramic and forms a sintered body when burned, so that the material retains its shape, the silicone laminate is fire resistant, and the silicone laminate is a cushioning material located between an adjacent pair of cells of the battery.

6. The battery according to claim 5, wherein side faces of the stacked silicone rubber layers (A) and silicone layers (B) of the silicone laminate face the adjacent pair of cells of the battery.

7. The battery according to claim 5, wherein the silicone laminate has sufficient fire resistance to retain its shape when burned with a gas burner for 5 minutes.

8. The battery according to claim 5, wherein the silicone laminate has flame retardance as well as fire resistance, and is classified as 5VB in a vertical burning test under a UL 94 standard.

9. The battery according to claim 5, wherein both the silicone rubber layer (A) and the silicone layer (B) are vulcanized with peroxide.

* * * * *